United States Patent
Stephens et al.

[11] Patent Number: 5,878,678
[45] Date of Patent: Mar. 9, 1999

[54] TRASH CLEANING STRUCTURE FOR A FURROW OPENING DEVICE

[75] Inventors: Lyle Eugene Stephens, Hampton, Ill.; Ignatz Wendling, Bettendorf, Iowa

[73] Assignee: Deere & Company, Moline, Ill.

[21] Appl. No.: 902,761

[22] Filed: Jul. 30, 1997

[51] Int. Cl.$^6$ .................................................. A01B 49/04
[52] U.S. Cl. .................. 111/139; 111/157; 111/143; 172/624.5; 172/604
[58] Field of Search .................... 111/139, 157, 111/143, 140, 163, 142, 141, 62; 172/604, 624.5

[56] References Cited

U.S. PATENT DOCUMENTS

| | | | |
|---|---|---|---|
| 5,076,180 | 12/1991 | Schneider | 111/139 |
| 5,095,832 | 3/1992 | Rumbaugh | 111/193 |
| 5,152,349 | 10/1992 | Roden | 111/139 X |
| 5,255,617 | 10/1993 | Williams et al. | 111/140 |
| 5,279,236 | 1/1994 | Truax | 111/139 |
| 5,341,754 | 8/1994 | Winterton | 111/139 |
| 5,349,911 | 9/1994 | Holst et al. | 111/139 |
| 5,461,995 | 10/1995 | Winterton | 111/139 |
| 5,555,825 | 9/1996 | Geddes | 111/62 X |
| 5,657,707 | 8/1997 | Dresher et al. | 111/139 |
| 5,660,126 | 8/1997 | Freed et al. | 111/139 X |

OTHER PUBLICATIONS

Dawn 1994 Catalog, p. 5, Jan. 1994.

*Primary Examiner*—Victor Batson

[57] ABSTRACT

A pair of angled disks supported by a four bar linkage from the upper end of the opener drawbar assembly clears trash from a narrow area in front of the opener. The four bar linkage has a virtual center located on or close to the center of the opener disk for good cleaning wheel tracking and for permitting the clearing disks to be spaced closely to the opener disk without interference between the disks. The clearing disks can rock vertically to follow ground contour and prevent excessive digging and soil movement. Shallow teeth on the disks also reduce soil penetration and soil disturbance.

20 Claims, 3 Drawing Sheets

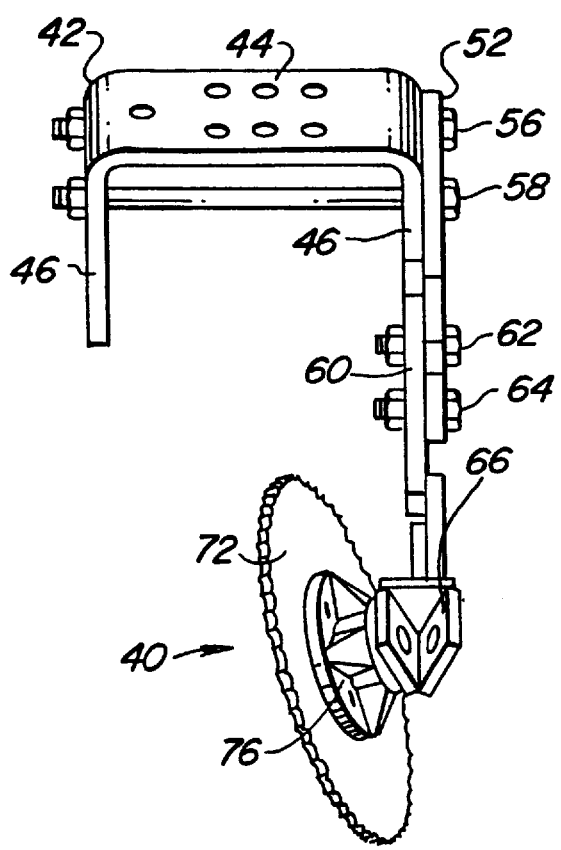

TRASH CLEANING STRUCTURE FOR A FURROW OPENING DEVICE

BACKGROUND OF THE INVENTION

1) Field of the Invention

The present invention relates generally to agricultural implements and, more specifically, to structure for clearing trash from a narrow area ahead of an opener or similar earthworking tool and for preventing hairpinning of trash around the opener.

2) Related Art

During planting operations, residue such as wheat straw or corn stalks is often encountered by the furrow opening device on the seeding implement. If the soil is soft or the residue is very tough, much residue is pushed into the seed trench. The residue prevents seed from contacting soil and reduces the opportunity for seed germination and healthy initial plant growth. Long pieces of trash can hairpin around the opener and cause poor operation.

Devices are available such as the type which include a pair of spoked wheels operating on substantially horizontal axles and steered relative to the forward direction so the spokes nearly touch or interlock. The point of closest proximity of the spokes, often referred to as the pinch point, is in the plane formed by the steered axles and is nearly one wheel radius above the soil surface. The amount of engagement of the spokes with the soil reduces this distance above the soil, and the spokes are separated at the point of soil entry to leave an uncleaned strip of ground. The uncleaned strip can be narrowed by increasing the operating depth, but increasing depth can cause excessive soil removal from the area. Other devices having a large wheel with narrow spokes permit excessively deep operation and soil displacement.

Mounting a cleaning device in the limited space available adjacent an opener has been a source of several problems. Fixed cleaning arrangements which are connected directly to the opener assembly or frame without provision for independent movement are subject to damage if obstacles or other large ground surface irregularities are encountered, and the location of the cleaning device relative to the opener can change detrimentally as the opener follows the ground contour. Pivoting arrangements often fail to track well, and if the cleaning wheel structure is supported closely adjacent the disk opener, the structure can actually hit the opener. Moving the cleaning structure farther ahead of the wheel to avoid interference requires more room than often is available, and as the cleaning wheels are moved ahead there is less stretching and holding of the trash close to the soil entry point of the disk so trash hairpins more easily at the disk edge. Supporting the cleaning device in a limited space and providing effective operation without nose-diving or bulldozing of soil during operation have continued to present problems.

BRIEF SUMMARY OF THE INVENTION

It is therefore an object of the present invention to provide an improved row cleaning structure for an opener or similar implement. It is a further object to provide such a structure which overcomes most or all of the aforementioned problems.

It is a further object of the present invention to provide a row cleaning structure having substantially improved tracking compared to previously available structures. It is another object to provide such a structure with angled disks defining a pinch point in close proximity to the opener device. It is still another object to provide such a structure which substantially eliminates problems of nose-diving and bulldozing of soil.

It is another object of the present invention to provide an improved row cleaning structure capable of independent movement relative to the frame and opener assembly. It is another object to provide such a structure which maintains a relatively constant position relative to an opener disk. It is yet a further object to provide such a structure which maintains long pieces of trash in a taut condition near the point of ground entry of the opener.

It is another object of the invention to provide a row cleaning arrangement for a disk type opener which includes shallow-toothed disks. It is another object to provide an improved support arrangement for such an opener.

A cleaning structure constructed in accordance with the teachings of the present invention includes a pair of angled, shallow-toothed clearing disks supported by a four-bar linkage from the upper end of the opener drawbar assembly. The four bar linkage has a virtual center located on or close to the center of the opener disk for good tracking and for permitting the clearing disks to be spaced closely to the opener disk without interference between the disks. The clearing disks can rock vertically to follow ground contour and prevent excessive digging and movement of soil. The shallow disk teeth provide better cleaning structure depth control and reduce soil penetration and soil disturbance. One of the clearing disks can be eliminated for certain operating conditions such as high speed operation. The remaining single disk clears trash to the side of the opener opposite the gauge wheel to assure optimum depth gauging for the opener.

These and other objects, features and advantages of the present invention will become apparent to one skilled in the art upon reading the following detailed description in view of the drawings.

BRIEF DESCRIPTION OF THE DRAWINGS

FIG. 4 is a view similar to FIG. 2 but showing one of the clearing disks removed.

DETAILED DESCRIPTION OF THE DRAWINGS

Figure 1:
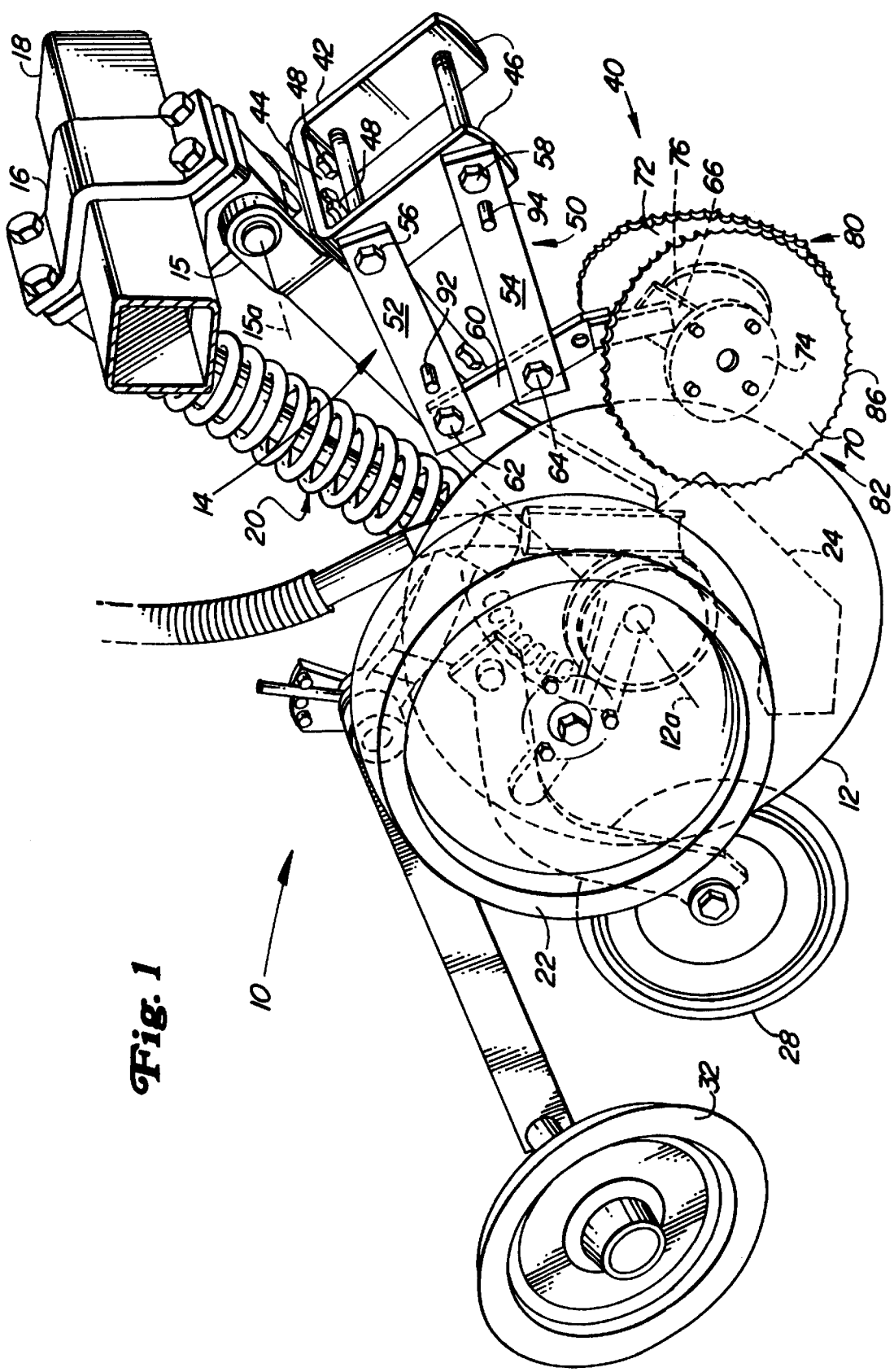
FIG. 1 is a front perspective view of an opener assembly with a row cleaning attachment.

Referring now to FIG. 1, therein is shown an opener assembly 10 of the type commercially available on the John Deere model 750 No-Till Drill. The opener assembly 10 includes an opener, shown as a single disk 12 which is supported at an angle with respect to the forward direction for rotation about an axis 12a, by an arm assembly 14 and opens a furrow for receiving seed. The arm assembly 14 includes a bifurcated upper forward end 15 pivotally connected by a bracket 16 to a transversely extending toolbar 18 for rocking about a transverse axis 15a. A spring assembly 20 connected between the bracket 16 and the lower end of the arm assembly 14 provides downward bias for the opener disk 12. A gauge wheel 22 mounted next to the leading side of the angled disk 12 gauges the depth of the disk and firms the furrow wall. Seed is directed into the furrow by a seed boot assembly 24 supported from the arm assembly 14 in the shadow of the disk 12. A press wheel 28 supported from the arm assembly 14 behind the disk helps push the seed into the soil at the bottom of the furrow for good seed-to-soil contact. A closing wheel 32 crumbles soil from the furrow wall and firms soil against the seed without compacting soil directly over the seed.

To clear residue from a narrow path in front of the disk 12 and prevent residue from being pushed into the furrow next to the seeds, a row cleaning assembly 40 is connected to the opener assembly 10. The assembly 40 includes a U-shaped bracket 42 having an apertured bight portion 44 connecting downwardly and forwardly angled sidelegs 46. Bolts 48 extending through selected apertures in the bight portion 44 and through the upper bifurcated end 15 of the arm assembly 14 secure the bracket to the underside of the end 15 for rocking with the arm assembly 14 about the transverse axis 15a. One of the sidelegs 46 is generally aligned in the fore-and-aft direction with the disk 12 and defines the forward upright portion of four bar linkage structure, indicated at 50. The linkage structure 50 includes fore-and-aft extending upper and lower links 52 and 54 having forward ends pivotally connected by rotatable shaft structures or bolts 56 and 58 to the selected sideleg 46 and aft ends connected to an upright member 60 by bolts 62 and 64. The bolts, 56 and 58 extend through the opposite sideleg 46 to stiffen the linkage structure connection. A V-shaped disk support 66 is fixed to the lower end of the member 60. The connection between the upright member 60 and the disk support 66 can be made adjustable to vary the angle of the disk support 66 relative to the vertical by adding a series of apertures to the elements and securing the elements with bolts through selectively aligned apertures.

Figure 2:
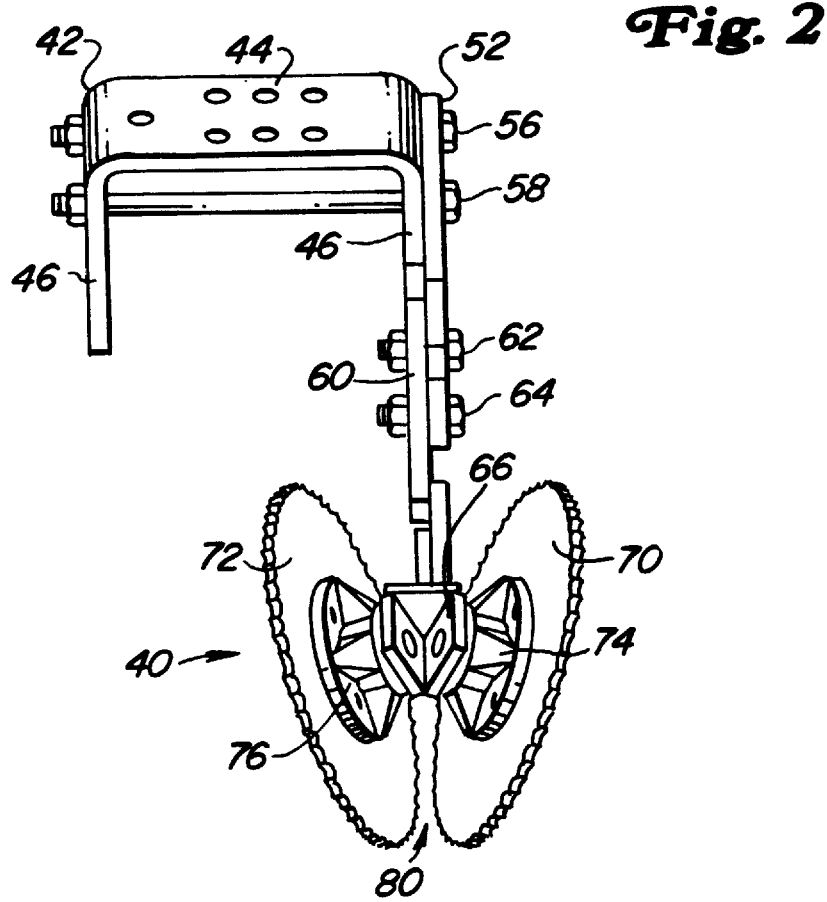
FIG. 2 is a rear perspective view of the row cleaning attachment showing the pinch point area of the clearing disks.
Figure 3:
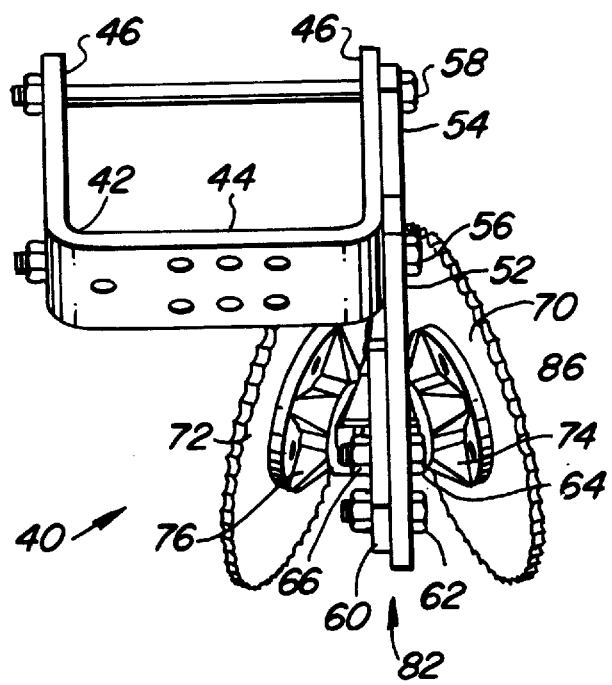
FIG. 3 is another perspective view of the attachment better showing the widened area behind the pinch point area.

Flat clearing disks 70 and 72 are connected by bearing structures 74 and 76 to the V-shaped support 66 for rotation about axes angled downwardly and forwardly from the transverse direction. The disks 70 and 72 define a lower, forward pinch point area shown generally at 80 (FIG. 2) and open rearwardly from the area 80 to a widened trash clearing and trash stretching area 82 (FIG. 3) adjacent the location on the periphery of the furrow opener disk 12 where the disk first penetrates the soil (FIG. 1). The pinch point location may be adjusted for different operating conditions by varying the angle of the disk support 66 relative to the vertical.

During operation, the disks 70 and 72 lie on opposite sides of the opener with the aft extremities of the disks 70 and 72 located rearwardly of the forward-most extremities of the edge of the disk 12 (FIG. 1). As shown, the axes of the disks 70 and 72 intersect at an angle of approximately 45 degrees. The bearing structures 74 and 76 are located on the trailing faces or shadow sides of the disks 70 and 72 to protect the bearings from soil and debris.

The disks 70 and 72 are preferably on the order of 10 inches (25 cm.) in diameter and have serrated periphery 86 which had a shallow gear tooth type of configuration with the gullet areas of the teeth projecting radially inwardly from the outermost tooth portion a distance substantially less than ten percent of the diameter of the disk and about 0.75 inches (1.9 cm.). The configuration of the periphery 86 reduces digging in and soil throw while providing good clearing and trash stretching characteristics. Trash which fails to be cleared outwardly from the disk path is held taut by the peripheries 86 of the disks 70 and 72 at a location adjacent the entry point of the opener. Stretching the trash at a location adjacent the disk 12 allows the disk to more effectively sever the trash and avoids hairpinning and wrapping problems at the opener.

In certain trash and operating conditions, for example, when the opener assembly is operating at relatively high speeds above about 5 miles per hour, only one of the disks 70 or 72 is necessary to clear a path for the opener. Preferably for the configuration shown in FIG. 1, the disk 72, which is angled toward the seed boot assembly 24 and away from the gauge wheel 22, is utilized and the disk 70 is removed (FIG. 4) in the single wheel embodiment to most effectively eliminate trash in the path of the gauge wheel to optimize depth control.

The four bar linkage structure 50 permits the disks 70 and 72 to float relative to the toolbar 18 and opener while generally retaining a preselected orientation of the disk relative to the opener to maintain uniform trash clearing and stretching characteristics in the rough field conditions that are often encountered with no-till and minimum tillage practices. The linkage 50 maintains the clearing disks in close proximity to the opener without interference between the opener and clearing disks over a wide range of operating positions. As the disk 12 and arm assembly 14 rock vertically over rough surfaces, the bracket 42 rotates with the arm assembly and moves the disks 70 and 72 in the direction which compensates for the movement of the disk 12 and retains the desired relationship between the disks. For example, as the disk 12 and arm assembly 14 rock upwardly about the axis 15a, the disk 12 will move through an arc rearwardly relative to the toolbar 18. At the same time, as a result of the rotation of the bracket 42 with the arm assembly 14, the lower end of the upright member 60 will rotate rearwardly so that the pinch point and clearing areas 80 and 82 are maintained in generally constant relationship relative to the entry point of the opener disk 12. Preferably, when the opener assembly is in operation, the virtual center of the linkage 50 (that is, the location where the axes of the links 52 and 54 taken through the respective link pivot points intersect) lies on or closely adjacent the axis of rotation (12a) of the disk 12 for good tracking between the disk 12 and clearing disks 70 and 72.

The U-shaped bracket 42 supports the linkage structure on either side of the arm assembly 14, depending on whether the opener disk 12 is angled to the left or to the right relative to the forward direction, and permits rocking of the clearing disks over a wide range of positions relative to the opener without interference between the disks and the opener and opener support structure. The disks 70 and 72 track the disk 12 well during operation and yet are free to move independently of the disk 12 in rough working conditions. The above-described arrangement also provides adequate clearance to permit the clearing disks to be raised relative to the toolbar 18 to a non-working position for transport. As shown, downward bias of the disks 70 and 72 is provided by the weight of the cleaning assembly 40, although spring bias may be provided for hard, trashy conditions by adding one or more tension springs (not shown) between the bolts 58 and 62 at the pin locations indicated at 92 and 94. A down stop may also be provided between the links to limit downward rocking of the row cleaning assembly 40.

Having described the preferred embodiment, it will become apparent that various modifications can be made without departing from the scope of the invention as defined in the accompanying claims.

We claim:

1. In an implement having a transversely extending toolbar member, cleaning structure for clearing trash from a narrow band of ground forwardly of a furrow opening device that includes a drawbar member having a leading end connected at a pivot area to the toolbar member for rocking vertically relative to the toolbar member, and a trailing end, the cleaning structure comprising a linkage having a forward end pivotally connected at the pivot area to the leading end of the drawbar member for rocking relative to the drawbar member, and an aft vertically movable end located forwardly of the furrow opening device; clearing disk structure rotatably mounted at the aft end of the linkage for movement vertically therewith adjacent the furrow opening device; and wherein the linkage includes link structure maintaining a generally constant relationship between the disk structure and the furrow opening device with vertical movement of the disk structure as the furrow opening device and the clearing disk structure encounter variations in ground and trash conditions.

2. The cleaning structure as set forth in claim 1 wherein the link structure comprises a four bar linkage and a bracket depending from the leading end of the drawbar member and rockable therewith, and wherein the four bar linkage comprises upper and lower fore-and-aft extending links pivotally connected at their forward ends to vertically offset locations on the bracket and at their aft ends to the clearing disk structure.

3. The cleaning structure as set forth in claim 1 wherein the disk structure comprises a pair of angled disks diverging in a rearward direction, wherein rear extremities of the disks lie on opposite sides of and overlap the furrow opening device.

4. The cleaning structure as set forth in claim 2 wherein the four bar linkage includes upper and lower rearwardly converging links with pivot locations defining a virtual center closely adjacent the furrow opening device.

5. The cleaning structure as set forth in claim 4 wherein the furrow opening device includes an opener disk having an axis of rotation, and wherein the virtual center of the four bar linkage lies on or closely adjacent the axis of rotation.

6. The cleaning structure as set forth in claim 1 wherein the disk structure comprises a first flat disk of preselected diameter and having a shallow tooth pattern with gullets, the gullets offset radially inwardly from a periphery of the disk structure substantially less than ten percent of the preselected diameter.

7. The cleaning structure as set forth in claim 1 wherein the disk structure comprises at least one clearing disk, the clearing disk having a rearward edge that overlaps one side of the furrow opening device.

8. The cleaning structure as set fourth in claim 7 wherein the at least one cleaning disk includes a periphery having a shallow gear-tooth configuration.

9. The cleaning structure set forth in claim 1 wherein the furrow opening device includes a disk opener having a leading edge penetrating the ground at a soil entry location and wherein the cleaning disk structure comprises two angled disks defining a forward pinch area and a rearward trash clearing and trash stretching area, and wherein the link structure maintains the trash clearing and trash stretching area adjacent the soil entry location as the drawbar member moves vertically.

10. Cleaning structure for clearing trash from a narrow band of ground forwardly of a fore-and-aft extending opener assembly including a fore-and-aft extending arm having a forward mounting end and an aft end supporting a furrow forming device, the furrow forming device having a forwardmost extremity, wherein the cleaning structure comprises a four bar linkage having a forward upright member connected to the forward mounting end of the arm, a pair of links pivotally connected to the forward upright member and extending rearwardly from the forward upright member, an aft upright member pivotally connected to the links for vertical movement relative to the forward upright member, and a pair of angled disks connected to the aft upright member and movable vertically relative therewith, the disks rotatable about offset axes to define a forward pinch point area and a diverging area behind the forward pinch point area and adjacent the furrow forming device, and wherein the angled disks include peripheries, at least one of the peripheries overlapping the forwardmost extremity of the furrow forming device.

11. The cleaning structure as set forth in claim 10 wherein the peripheries of the disks include a shallow gear tooth pattern.

12. The cleaning structure as set forth in claim 10 wherein the disks overlap the furrow forming device.

13. The cleaning structure as set forth in claim 10 wherein the pair of links define a virtual center lying on or close to the furrow forming device, the four bar linkage maintaining the disks generally in a constant attitude relative to the furrow forming device as the disks move vertically.

14. The cleaning structure as set forth in claim 13 wherein the furrow forming device comprises disk structure rotatable about a disk axis, and the virtual center lies on or close to the disk axis.

15. Cleaning structure for clearing trash from a narrow band of ground forwardly of a fore-and-aft extending opener assembly including an opener disk supported from a vertically rockable fore-and-aft arm assembly for rotation about an opener axis, the arm assembly including an arm having a forward pivot area, the disk including a leading edge for penetrating the ground at a leading soil entry location, the cleaning structure comprising:

a clearing disk assembly including a clearing disk, the clearing disk having a periphery with a rearmost extremity;

linkage structure including a bracket depending from the forward pivot area of the arm connecting the clearing disk to the arm for rocking vertically relative to the arm assembly with the rearmost extremity closely adjacent the soil entry location, the linkage structure maintaining the clearing disk periphery in a generally constant relationship relative to the leading edge as the arm assembly rocks vertically over the ground.

16. The cleaning structure as set forth in claim 15 wherein the linkage structure comprises a four bar linkage having a forward end pivotally connected to the bracket, and wherein the bracket is rockable with the arm assembly.

17. The cleaning structure as set forth in claim 16 wherein the four bar linkage includes forward pivot locations, and the arm is rockable about a transversely extending axis at the forward pivot area, wherein the forward pivot locations are located directly below the transversely extending axis.

18. The cleaning structure as set forth in claim 16 wherein the four bar linkage defines a virtual center which lies on or closely adjacent the opener axis.

19. Cleaning structure for clearing trash from a narrow band of ground forwardly of a fore-and-aft extending opener assembly including an opener disk supported from a vertically rockable fore-and-aft arm assembly for rotation about an opener axis, the disk including a leading edge for penetrating the ground at a leading soil entry location, the cleaning structure comprising:

a clearing disk assembly including two disks having axes of rotation angled relative to each other to define a forward pinch area and opening rearwardly from the pinch area to a rearward open area;

linkage structure connecting the angled clearing disks to the arm assembly for rocking vertically relative to the arm assembly with the rearward open area closely adjacent the soil entry location, the linkage structure maintaining the rearward open area in a generally constant relationship relative to the leading edge as the arm assembly rocks vertically over the ground; and wherein the linkage structure comprises a bracket depending from a forward end of the arm assembly and rockable therewith, and the linkage structure comprises upper and lower fore-and-aft extending links pivotally connected at their forward ends to vertically offset locations on the bracket and at their aft ends to the clearing disk assembly.

20. The cleaning structure as set forth in claim 19 wherein the opener assembly includes a depth gauging member, and one of the clearing disk assembly disks is removable for high speed operation of the opener assembly, wherein when the one clearing disk assembly disk is removed, the disk remaining removes trash from an area preceding the depth gauging member to reduce variations in depth of the opener assembly.

* * * * *